US007822738B2

(12) United States Patent
Andersen et al.

(10) Patent No.: US 7,822,738 B2
(45) Date of Patent: Oct. 26, 2010

(54) COLLABORATIVE WORKSPACE CONTEXT INFORMATION FILTERING

(75) Inventors: Hans Andersen, Redmond, WA (US); Brian Meek, Redmond, WA (US); David Nichols, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 121 days.

(21) Appl. No.: 11/606,799

(22) Filed: Nov. 30, 2006

(65) Prior Publication Data

US 2008/0133501 A1    Jun. 5, 2008

(51) Int. Cl.
G06F 7/00   (2006.01)
G06F 17/30   (2006.01)

(52) U.S. Cl. .................. 707/713; 707/721; 709/223; 709/224

(58) Field of Classification Search .............. 707/1–206
See application file for complete search history.

(56) References Cited

U.S. PATENT DOCUMENTS

| 5,596,502 | A | 1/1997 | Koski et al. |
| 5,657,450 | A | 8/1997 | Rao et al. |
| 6,237,025 | B1 | 5/2001 | Ludwig et al. |
| 6,898,642 | B2 * | 5/2005 | Chafle et al. ............. 709/248 |
| 6,983,258 | B1 | 1/2006 | Tye et al. |
| 7,099,798 | B2 | 8/2006 | Yu et al. |
| 7,305,381 | B1 * | 12/2007 | Poppink et al. ............. 707/3 |
| 2002/0152271 | A1 * | 10/2002 | Chafle et al. ............. 709/204 |
| 2003/0144868 | A1 * | 7/2003 | MacIntyre et al. ............. 705/1 |
| 2003/0229900 | A1 * | 12/2003 | Reisman .................. 725/87 |
| 2004/0216039 | A1 | 10/2004 | Lane et al. |
| 2004/0230447 | A1 | 11/2004 | Schwerin-Wenzel et al. |
| 2004/0261013 | A1 | 12/2004 | Wynn et al. |

(Continued)

FOREIGN PATENT DOCUMENTS

| JP | 05257853 A | 10/1993 |
| JP | 2004178612 A | 6/2004 |
| KR | 1019980015519 A | 5/1998 |

OTHER PUBLICATIONS

Paul P. Maglio et al. "Suitor: an attentive information system," 2000, ACM, In Proceedings of the 5th international Conference on intelligent User interfaces (New Orleans, Louisiana, United States, January 9-12, 2000), ISBN:1-58113-134-8, pp. 169-176.*
"Cyclades an open collaborative virtual archive environment," http://www.ercim.org/ cyclades/overview.html.

(Continued)

*Primary Examiner*—Mohammad Ali
*Assistant Examiner*—Angelica Ruiz

(57) ABSTRACT

Architecture that provides real-time opportunistic access to data that is relevant and/or related user activities. Ways are disclosed to use information of a single workspace to structure automatic searches into a number of data stores in order to opportunistically extract relevant information therefrom. An email client can use workspace content to train a filter for identifying new messages deemed relevant or related to the content and topics of the workspace, a system can be provided to use the content of a single web site as contextual data for providing auto-generated links to other sites within the corporate enterprise, a collaborative application can natively understand the content being shared and then look for specific terms in the content which can be employed for generating a search query and returning relevant and/or related data, and combinations thereof are provided for automatically generating and searching data stores for relevant and related information.

20 Claims, 15 Drawing Sheets

U.S. PATENT DOCUMENTS

| | | |
|---|---|---|
| 2006/0026235 A1 | 2/2006 | Schwarz et al. |
| 2006/0053194 A1 | 3/2006 | Schneider et al. |
| 2006/0101022 A1 | 5/2006 | Yu et al. |
| 2006/0183100 A1 | 8/2006 | Voehl et al. |

OTHER PUBLICATIONS

Bothma, et al., "Designing a Web-Based Collaborative Workspace," http://general.rau. ac.za/infosci/www2003/Papers/Bothma,%20P %20&%20Bothma,%20TJD%20Designing%20a%20Web-based %20collaborative.pdf.

Convertino, et al., "A Multiple View Approach to Support Common Ground in Distributed and Synchronous Geo-Collaboration," Date: 2005, http://people.cs.vt.edu/~bevost/papers/CMV2005.pdf.

International Search Report for International Application No. PCT/US2007/079647 dated Jan. 10, 2008.

\* cited by examiner

COLLABORATIVE WORKSPACE CONTEXT INFORMATION FILTERING

BACKGROUND

Networks such as the Internet provide the infrastructure for storing and serving up enormous amounts of information to computer users. Technological convergence is bringing together not only IP networks for computer users but mobile networks for mobile users as well. For example, IP services can now be provided to cellular users (e.g., messaging) and telephone calls can now be conducted over IP networks. Moreover, no longer is text the principal means for intercommunications. Most devices have multimedia capability that provide combinations of audio, video, text, graphics and images for a richer experience for computer users and mobile users alike.

Advertisers have recognized the importance of these networks (IP and/or cellular) in reaching millions of potential customers with products and services. Information related to online user behavior can translate into huge profits for companies. Hence, advertisers and web sites track user behavior as a way to learn more about user online habits, intents and goals to increase sales by pushing targeted content to users for commercial gain as well as for maintaining customer loyalty, for example. Online user behavior can be tracked using cookies that record the web site the user visited and when, for example. More sophisticated means can be employed to track user interaction related to content presented, web page click-through rates for particular page content, content type, etc. Corporate enterprise networks have seized upon these capabilities to provide corporate services to employees, improve productivity and, product and/or services information to preferred customers.

Users have the means for searching and communicating on virtually any topic of interest, via any device, and as cellular networks provide greater terrestrial coverage, from virtually anywhere. However, this vast resource of information presents a formidable challenge when trying to find the desired information. This can be evidenced by performing an online search using a conventional search engine and receiving millions of hits which could never be perused in an efficient manner. Accordingly, software vendors continue to strive for better techniques for searching and finding only the desired relevant information from the myriad of data sources available.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed innovative architecture describes techniques that allow an application to provide real-time, opportunistic access to relevant and/or related data that is useful to user and/or system activities. In other words, in one application, the innovation describes ways of using the information in a single workspace to dynamically structure and automatically execute searches or queries against one or more data stores and/or data sources in order to opportunistically extract relevant information from the data stores for the task at hand.

In a more specific application, an email client can use the contents of a workspace to train a Bayesian or similar filter that can identify new incoming messages (e.g., emails, text/multimedia messages) that are deemed to be relevant or related to the content and topics of the workspace. In another example, a system can be provided to use the content of a single web site as contextual data that can further be used to provide auto-generated links to other sites within the corporate enterprise. In yet another example, a collaborative application can natively understand the content that is being shared (e.g., in a shared or collaborative workspace) and then look for specific terms in the content which can be employed for generating a search query and returning relevant and/or related data.

The innovation provides the capability to link existing workspaces with existing collections of data. Moreover, an additional capability is to link future workspaces with future collections of data. Accordingly, the workspaces are made more productive and effective through this linkage.

In another implementation, an inference component is provided that employs probabilistic and/or statistical-based analysis to learn and reason about user activities and accessed documents, and in response thereto, can prognose or infer an action that a user desires to be automatically performed.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
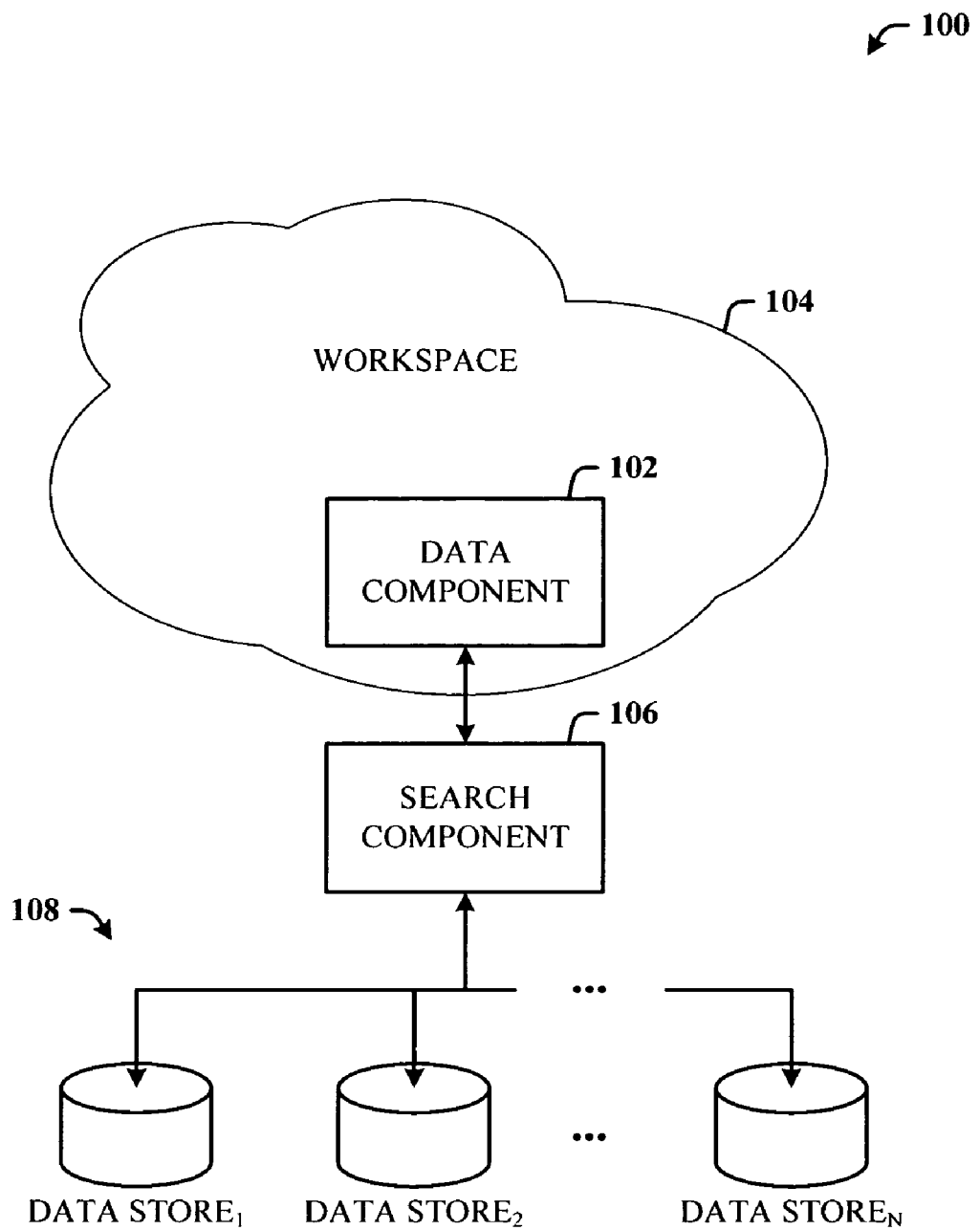
FIG. 1 illustrates a system that facilitates data management in accordance with the disclosed innovation.

The disclosed architecture describes techniques that provide real-time, opportunistic access to data that can be relevant and/or useful to activities of a user. In a more specific application, the innovation describes a number of ways to use the information in a single workspace to structure automatic searches or queries into a number of data stores in order to opportunistically extract relevant information therefrom. In one example, an email client can use the contents of a workspace to train a Bayesian or similar filter that can identify new incoming messages (e.g., emails or RSS (really simple syndication) messages) that are deemed to be relevant and/or related to the content and topics of the workspace. In another example, a system can be provided to use the content of a single web site as contextual data that can be used to provide auto-generated links to other sites within the corporate enterprise. In yet another example, a collaborative workspace application can natively understand the content that is being shared and then look for specific terms in the content which can be employed for generating a search query and returning relevant and/or related data.

A "workspace", as defined herein, includes the variety of scenarios and technologies that allow the involvement of one or more users working together (or collaborating) on one or more pieces of data. The workspace can be a collection of information that describes a body of work or activities pertaining to a set of related problems, tasks or projects. In other words, the workspace can include a single user environment wherein a single user works and interacts with data. Additionally, the workspace can include a collaborative context or session in which two or more users interact. Workspaces often can include a number of names or identities describing the people involved in the work, a number of documents that contain information about the work, a number of links (e.g., URLs-uniform resource locators, file paths, etc.) to external content pertaining to the work, and a number of calendar entries, meeting requests, or other schedule content pertaining to the work. Examples of information that can be grouped under the workspace concept as utilized herein include an email discussion thread having senders and recipients of the email messages, the text of the emails, any sub-threads or meeting requests that derive from the email discussion, and any attachments or links in the individual messages. Other information can include a single shared site, with members, documents, and announcements, and a collaborative session of an application with participants, invitees, and real-time shared content.

A "data store", as referred to herein, includes a broad collection of documents and information, oftentimes one of which is much too large and diverse for a single person to completely understand or internalize. Some examples include a complete set of shared sites used across an entire company and the site content, all the documents on a given user computer, a large set of RSS feeds, and the Internet.

The searches in accordance with various embodiments described herein can be performed as Internet searches as well as searches within an intranet (e.g., a search of information stored on a remote desktop computer or within a corporate network). Mobile devices are typically present on users (or proximate thereto) during most hours of the day. Accordingly, such devices provide a very convenient mechanism to deliver relevant or desired content to a user in an immediate fashion.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

Referring initially to the drawings, FIG. 1 illustrates a system 100 that facilitates data management in accordance with the disclosed innovation. The system includes a data component 102 for monitoring workspace information of a workspace 104, and a search component 106 for automatically searching one or more data stores 108 (denoted DATA STORE$_1$, DATA STORE$_2$, ..., DATA STORE$_N$, where N is a positive integer) for data relevant to the workspace information. The search component 106 dynamically formulates a search query based on the workspace information and executes the query against the data stores 108 to find relevant and/or related information that can be useful to a user and/or subsystems operating in or in support of the workspace 104.

Workspace information can be based on user activity, user profile information, system activity, and information derived from interaction with the workspace (e.g., remote communications, data exchanges). Thus, workspace information can include, but is not limited to, user names, user identities, documents, document content, content type (e.g., audio, video, text, image, ... ), messages (e.g., email, voice files, SMS-short message service, MMS-multimedia message service, and instant message), message content, message sender/recipient, calendar information, scheduling information, user contact information, favorites information, and so on.

The relevant data searched for by the search component 106 can be extracted from one or more of the data stores 108 based on a current workspace activity (e.g., user, system), as well as past activity. Such activity can also form the basis for predicting future activity. A data store of the data stores 108 can be local to a client (e.g., hard drive, cache memory, external drive systems, local application data, stored documents, ... ) via which a user accesses the workspace 104, and/or a data store remote from the workspace environment 104 such as associated with, for example, web sites, database systems, cache subsystems, other workspaces, collaboration sessions, messaging systems, enterprise system, Internet data sources, and so on.

In one search action, the search component 106 automatically searches for a web site that serves web site data relevant to the workspace information. The web site can be located on the Internet or an intranet that serves content (e.g., enterprise) related to a workspace activity. The workspace 104 is not limited to a single working environment of a single user, but can include a shared workspace as part of a real-time collaborative session. In the shared workspace, the workspace information can include the same information as a single user workspace, but now for each session user, for example, session data and/or user activity data of one or more of the session users which can be employed by the search component 106 to search for relevant data from local and/or remote data sources 108.

More detailed implementations relate to, for example, monitoring and filtering email, using the contents of a web site as contextual data for providing auto-generated links to other sites, collaborative session information, and combinations thereof, which will be described herein.

Figure 2:
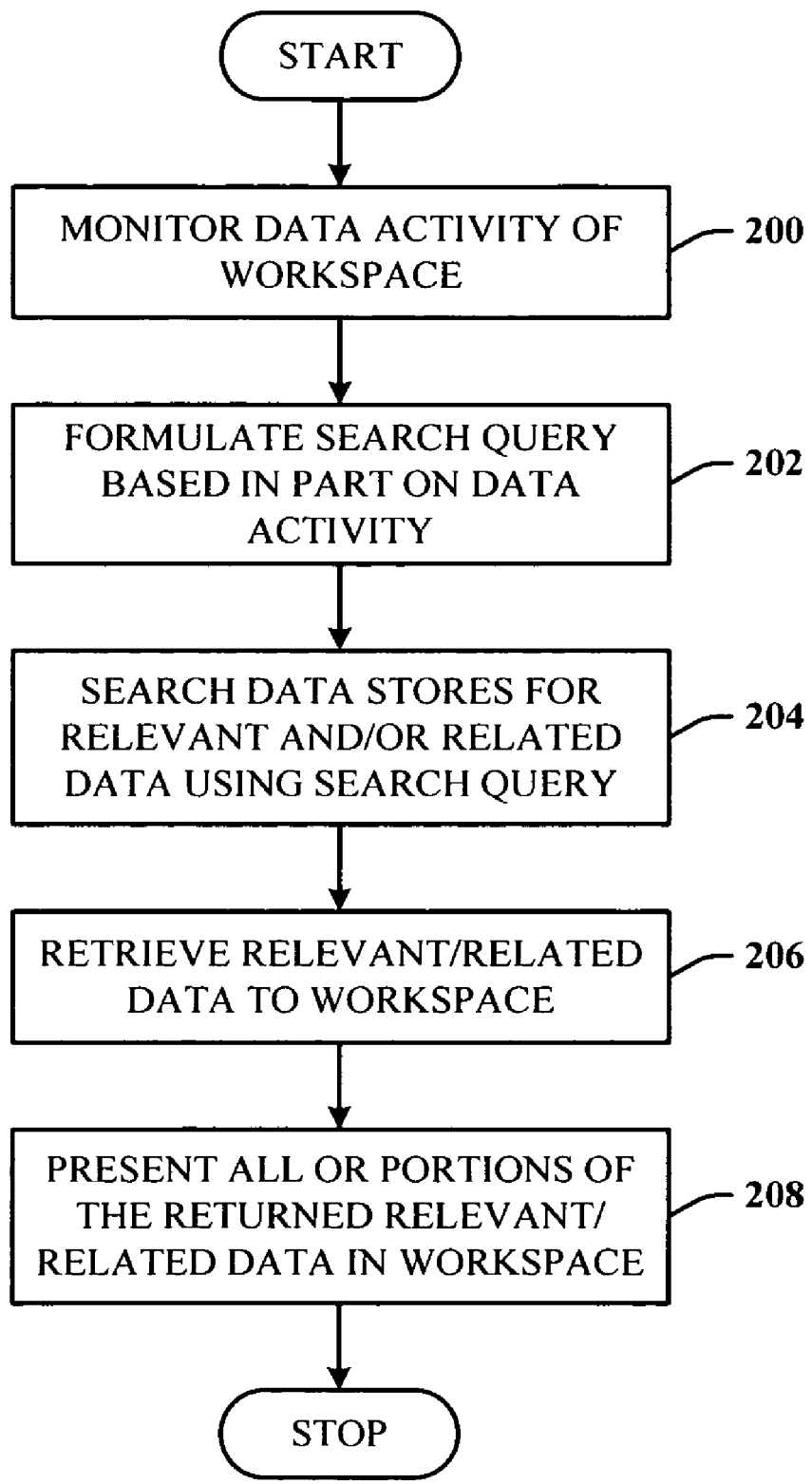
FIG. 2 illustrates a methodology of managing data in accordance with the disclosed innovation.

FIG. 2 illustrates a methodology of managing data in accordance with the disclosed innovation. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, data activity of a workspace is monitored. At 202, a search query is automatically formulated based in part on the data activity. At 204, one or more data stores are then searched for relevant data using the formulated search query. At 206, the relevant and/or related data is retrieved to the workspace. At 208, all or portions of the returned data can be presented in the workspace. It is to be understood that in some instances, none of the results will be presented to the user, but can be employed in background processes to effect changes to existing information being viewed.

Figure 3:
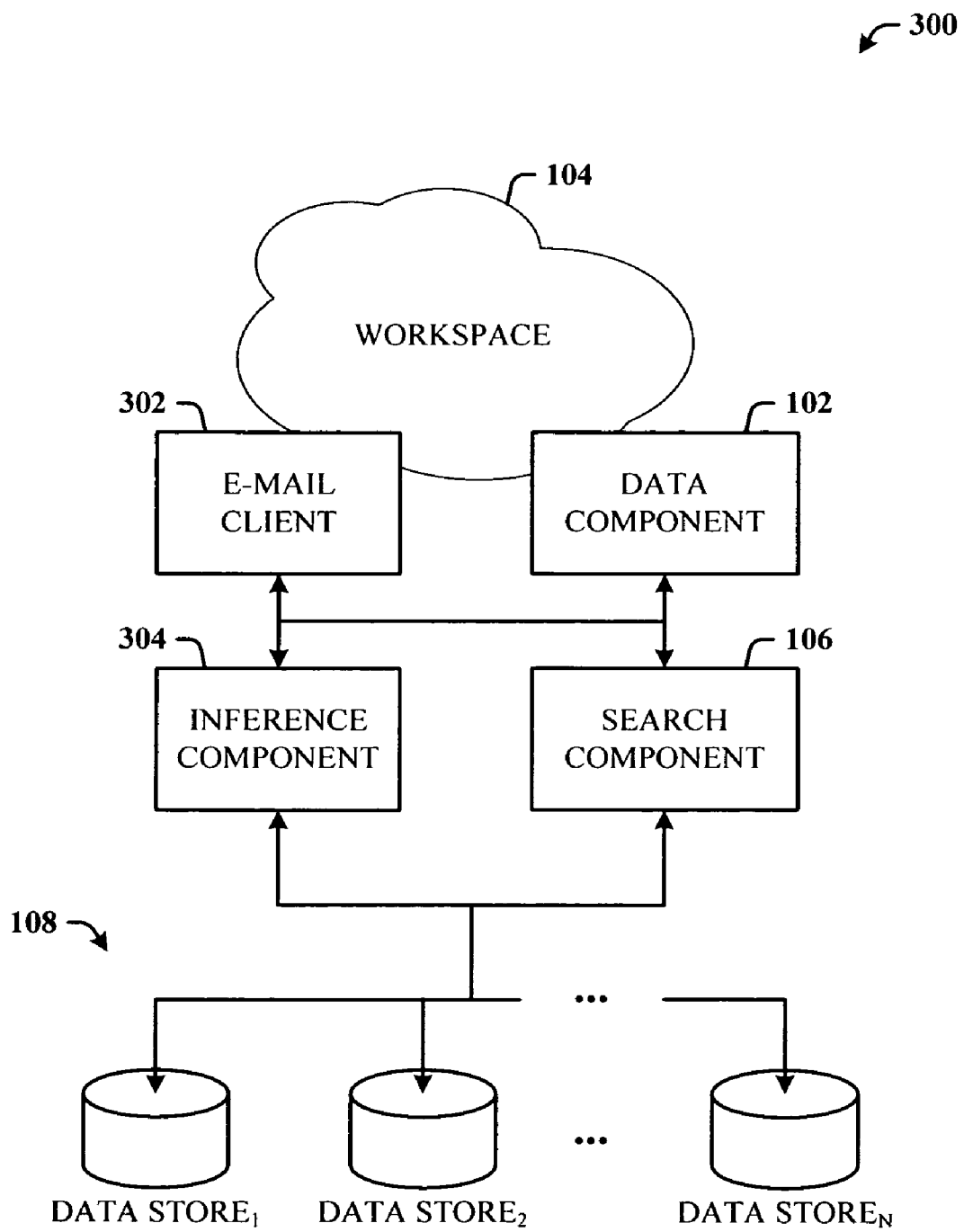
FIG. 3 illustrates a system that performs workspace-relevant message filtering as part of searching for relevant workspace information.

FIG. 3 illustrates a system 300 that performs workspace-relevant message filtering as part of searching for relevant workspace information. In the context of messaging associated with email, email clients often contain filters (e.g., automatically trainable such as Bayesian, or manually trainable) that can learn to identify unwanted (or spam) email. As a result, the unwanted email can either be quarantined or deleted before consideration for presentation to the end-user.

The system 300 includes the data component 102 for monitoring data activity (e.g., user and/or system-based) and the search component 106 for automatically formulating a search query and executing the query against one or more of the data stores 108. Additionally, in this implementation, an email client 302 (e.g., a communications component) can use the content of the workspace 104 (e.g., user names, files, content) to train a filter that can identify new incoming emails or RSS messages that are deemed to be relevant and/or related to the content and topics of the workspace 104. (RSS is an XML-based (extensible markup language) system that allows users to subscribe to web sites.) The email client 302 can then redirect (or copy) matching messages to a collection of "related topics" or similar categorizations associated with the workspace 104. As the content of the workspace 104 evolves over time, an inference component 304 (e.g., a classification filter) can be automatically brought up-to-date by using the most up-to-date content. Note that a workspace user does not need to actively configure new search criteria or modify the inference component 304; the email client 302 is sufficiently robust to perform this automatically when, for example, the email client 302 or other user applications are exposed to new workspaces.

The system 300 employs the inference component 304 (e.g., for machine learning and reasoning) which facilitates automating one or more features, for example, associated with filter communications (e.g., email messages). The subject architecture (e.g., in connection with selection) can employ various inference-based schemes for carrying out various aspects thereof. For example, a process for determining when a message is spam versus non-spam can be facilitated via an automatic classifier system and process. Moreover, with respect to data stores, the classifier can be employed to determine which of the data stores 108 should be searched using the formulated query.

A classifier is a function that maps an input attribute vector, x=(x1, x2, x3, x4, xn), to a class label class(x). The classifier can also output a confidence that the input belongs to a class, that is, f(x)=confidence(class(x)). Such classification can employ a probabilistic and/or other statistical analysis (e.g., one factoring into the analysis utilities and costs to maximize the expected value to one or more people) to prognose or infer an action that a user desires to be automatically performed.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, for example, various forms of statistical regression, naïve Bayes, Bayesian networks, decision trees, neural networks, fuzzy logic models, and other statistical classification models representing different patterns of independence can be employed. Classification as used herein also is inclusive of methods used to assign rank and/or priority.

As will be readily appreciated from the subject specification, the subject architecture can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

As mentioned above, the inference component 304 need not be limited to monitoring messages (e.g., email), but can also be employed to learn and reason about other activities, for example, which of the data stores 108 to select for searching, what workspace activity to focus on monitoring, and also for formulating search queries for the searches. For example, if workspace activity is currently focusing on text of a document from a certain data source location, a more focused search can be created related only to past relevant and/or related documents and document content and of the data source location, rather than expending system time searching for all relevant and/or related information and across other data stores.

Figure 4:
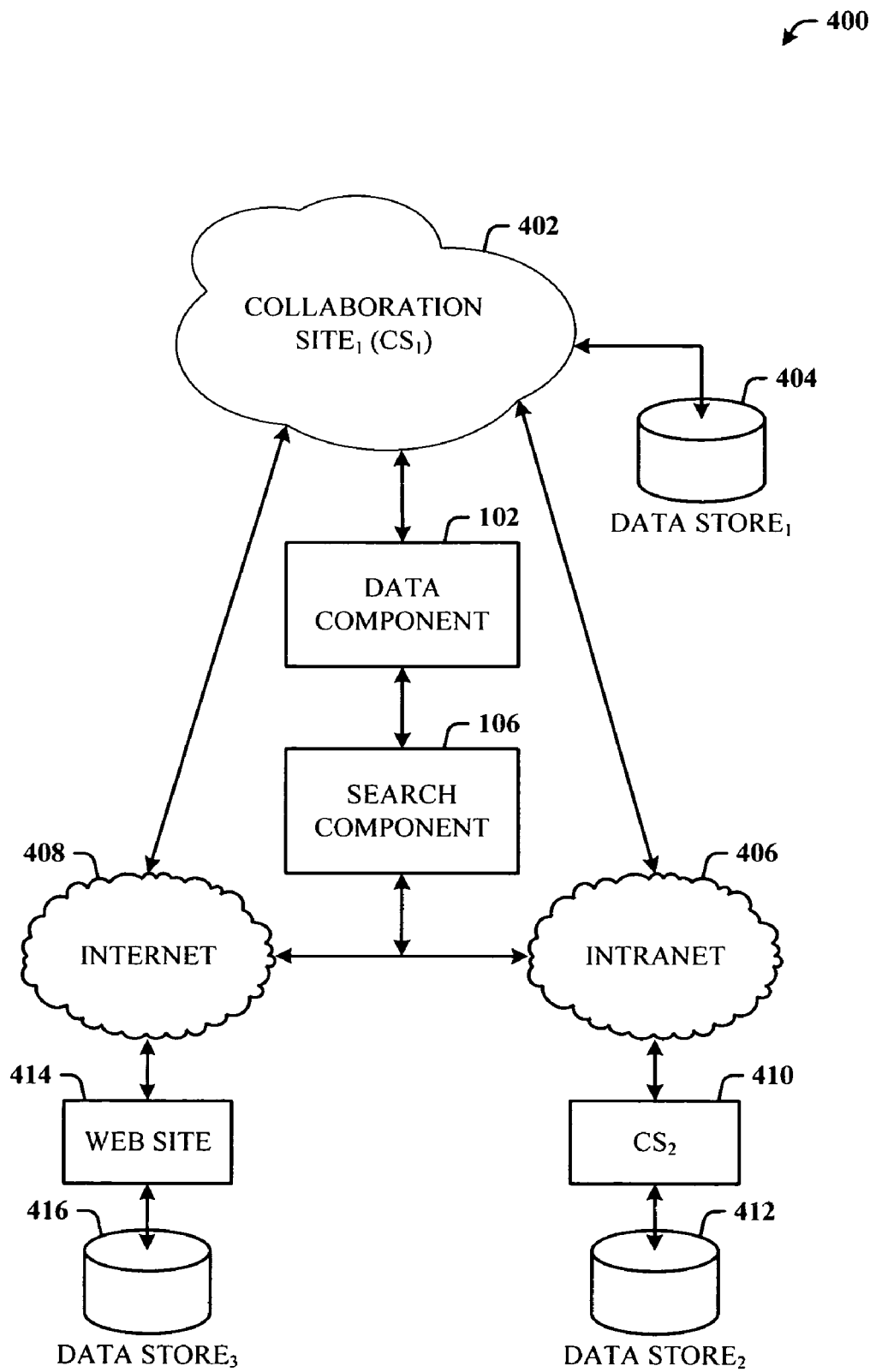
FIG. 4 illustrates an alternative system that facilitates searching for relevant and/or related information in a collaborative workspace setting.

FIG. 4 illustrates an alternative system 400 that facilitates searching for relevant and/or related information in a collaborative workspace setting. Many conventional web sites use the content being served up as a source of contextual data that can be used to choose appropriate targeted advertisements to display. Building on that idea in accordance with the disclosed innovation, a workspace that is a collaboration environment, for example, can be configured to use the content of one collaboration site (e.g., user client or web site) as contextual data for creating auto-generated links to other collaboration sites. These sites can be external (e.g., on the Internet) and/or internal to a corporate enterprise, for example.

Here, a first collaboration site 402 (denoted COLLABORATION SITE$_1$ (CS$_1$)) includes an associated site data store 404 (denoted DATA STORE$_1$). The first site 402 facilitates collaboration among multiple users for the desired topic(s) of interest and the exchange of information. The data component 102 interfaces to the first site 402 to monitor collaboration information and associated participant activities. The search component 106 receives collaboration information from the first site 402 and automatically formulates a search query for execution against other data sources for information relevant and/or related to activity of the first site 402. The search component 106 can interface to an intranet 406 (e.g., a corporate enterprise network) and an external network 408 (e.g., the Internet) for query execution against selected data stores and information. Here, the intranet 406 has disposed thereon a second collaboration site 410 (denoted CS$_2$) that includes an associated second data store 412 (denoted DATA STORE$_2$). Additionally, the Internet 408 has disposed thereon a web site 414 that includes an associated third data store 416 (denoted DATA STORE$_3$).

In operation, if data activity on the first site 402 includes new content in the form of names or technical terms (e.g., from several new or updated documents), for example, the data component 102 will track this information and facilitate an automatic search by the search component 106 to one or more of the other sites (410 and/or 414) to find content and links that are related to the new names or term(s) of the first site 402. For example, if a corporate user adds one or more documents that refer to "STUN/TURN" (a networking protocol) to an internal shared site, an automatic search can be configured and performed against the second site 410 (and the second data store 412) using one or more of the network protocol terms to provide links to other groups within the corporate enterprise environment that are working with that technology.

In a more expansive application, the search component 106 can create a search query for execution against an external site (e.g., the web site 414 and third data store 416) located on the Internet 408 to automatically find relevant and/or related content. In other words, the search can include internal/external web sites as well as internal/external collaboration sites (e.g., single or multi-user). Accordingly, in addition to the known links to another in-house team's site, a link can be presented directly to the external IEEE (Institute for Electrical and Electronics Engineers) RFC (request for comment) web site for the STUN/TURN protocol specification. As described with the workspace-relevant message filtering example supra, no explicit end-user intervention is required. The content and membership of the first collaboration site 402 can automatically serve as the initial seed of context of the search formulation and execution against selected sites (410 and 414) and data stores (412 and 416).

Real-time collaborative applications can be rich sources of context from which can be drawn criteria to construct and execute searches for related information. If the collaborative application can natively understand the content that is being shared (e.g., a text slide or whiteboard slide in a collaborative session), then the application can look for specific terms in the document content.

Figure 5:
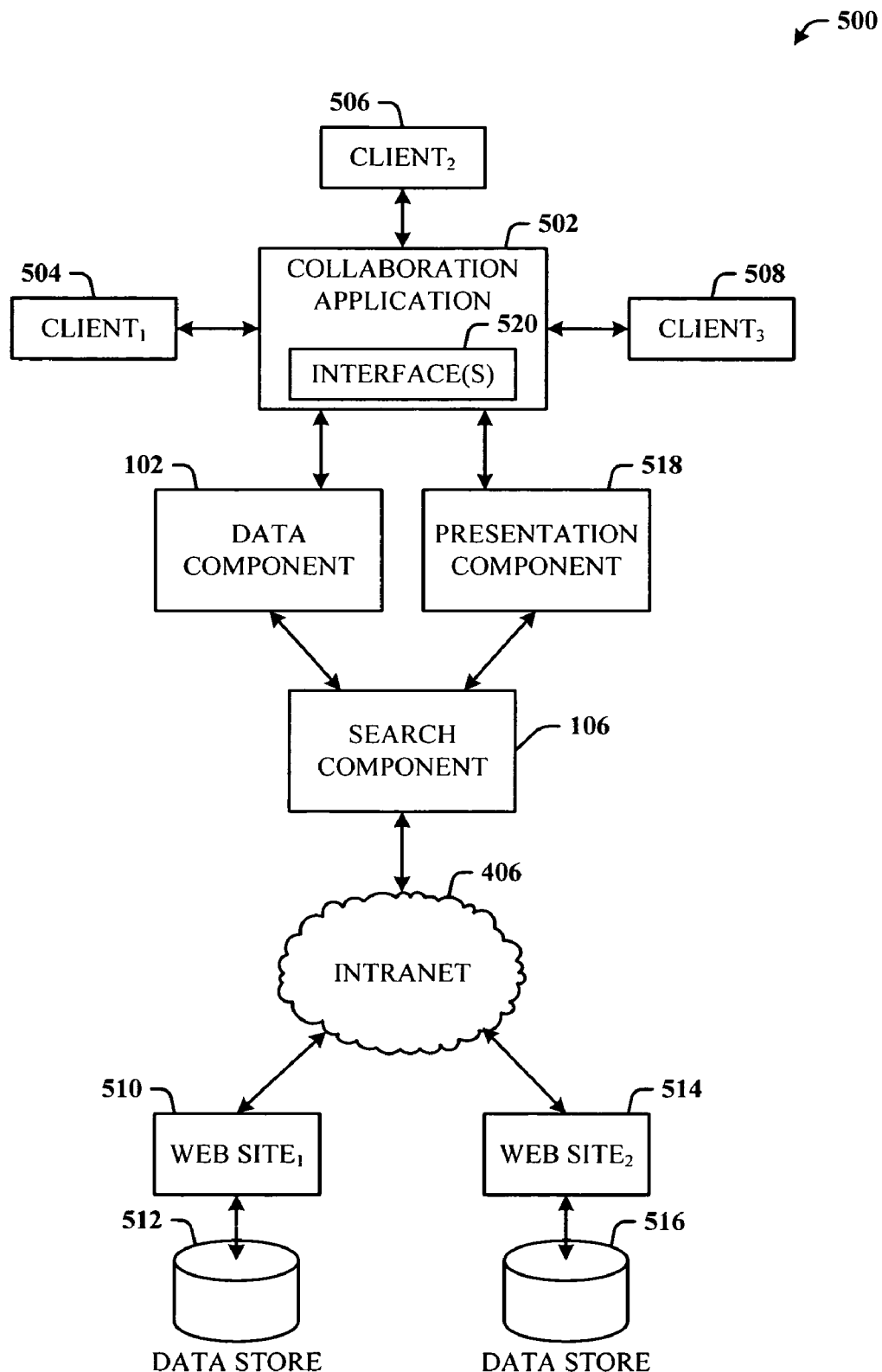
FIG. 5 illustrates an alternative system where a collaboration application can natively monitor shared information in a collaborative workspace session.

FIG. 5 illustrates an alternative system 500 where a collaboration application 502 can natively monitor shared information in a collaborative workspace session. In this particular example, the collaboration application facilitates collaboration among three users: a first client 504, a second client 506, and a third client 508. As is typical in the course of collaboration, the users exchange information in the form of documents (e.g., text, multimedia) and communications (e.g., email, voice data), for example. The collaboration application 502 passes all or some of the shared information to the data component 102 for processing whereby the search component 106 creates and executes a search across the intranet 406 against enterprise web sites: a first web site 510 (and data store 512) and a second web site 514 (and data store 516).

Search results can be returned to a presentation component 518 for selective presentation of the results. In other words, based on the monitoring of data and/or user activity by the data component 102, the presentation component 518 can display the results information in a way that is appropriate for the human activities of the users in the workspace by analyzing the different information being worked on and displaying the results in a context appropriate manner. When returned, the search results do not need to be displayed at all. However, it is to be understood that at some point in time it is desirable to bring the search results to the attention or awareness of the user(s) who are doing the work. For example, related collections of documents could be found and populated as an appendix or bibliography that is hidden from view until the user has the free time to look at it.

Alternatively, if the collaborative application 502 is displaying a portion of a user's screen (referred to as application sharing) without having direct access to the shared-content internals, the collaborative application 502 can provide one or more interfaces 520 that the application-being-shared can use to tell the collaborative application 502 about key contextual information within the document. For example, by treating the shared-content data plus scheduling information plus the collaborative-session roster as part of the workspace, the components 102, 106 and 518 can facilitate performance of background searches of data stores (512 and 516), and present the findings in a sidebar or other portion of the client user interface (UI). This can serve as the basis of a related-documents pane, for example, that provides links to other user documents that could be related to the content being shared.

Real-time collaborative applications could, once a working-session is completed, collect the accumulated workspace context information of the session and pass that information to the user's email client to automatically create a new updated message filter. This would permit subsequent emails that are related to the now-completed collaborative workspace session to be marked (or tagged) and called out as related to that prior working session. In the client UI, a new email can be tagged as "Follow-up from last-week's working session with Chris", for example.

Figure 6:
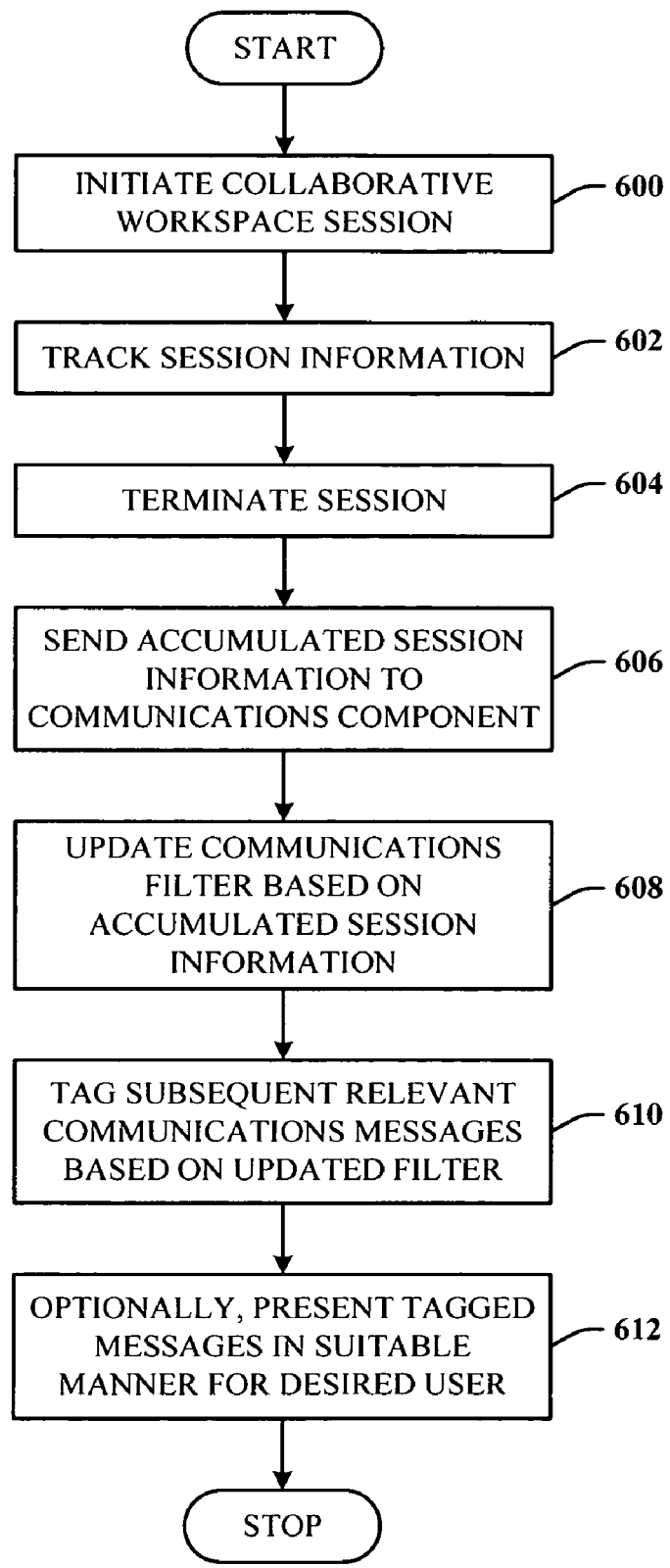
FIG. 6 illustrates a method of updating a communications filter using accumulated workspace session information.

FIG. 6 illustrates a method of updating a communications filter using accumulated workspace session information. At 600, a collaborative workspace session is initiated. At 602, session information is tracked. At 604, the session is terminated. At 606, the accumulated session information is sent to the communications component (e.g., email program). At 608, a communications filter (e.g., email spam filter) is updated based on the accumulated session information. At 610, communications messages received subsequent to the terminated session are deemed relevant and/or related and tagged accordingly. At 612, optionally, the tagged relevant and/or related messages can be presented in a suitable manner to desired users.

An existing workspace can be used as the launching point for a new real-time collaborative workspace session, in which case the workspace can send a link to its accumulated workspace information to the collaborative application. The application can then perform the union of the workspace information and its own content as the basis for related document searches. When the session is over, the application can then send information about what was shared and with what user(s) back to the original workspace. The original workspace uses the information to update its history and related query filter(s), if the filter(s) exist.

Figure 7:
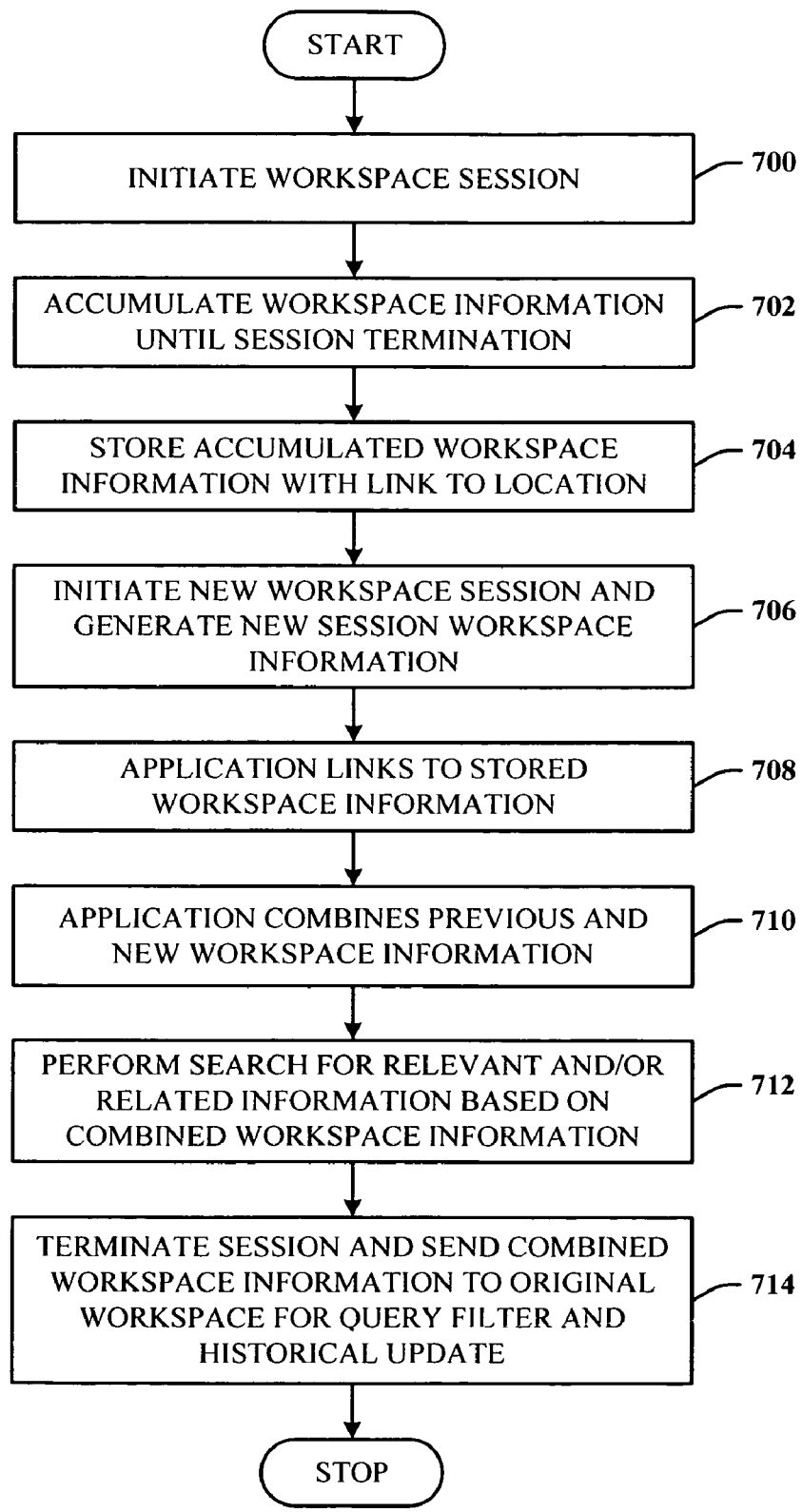
FIG. 7 illustrates a method of utilizing previous workspace information as a basis for a new workspace session.

FIG. 7 illustrates a method of utilizing previous workspace information as a basis for a new workspace session. At 700, a workspace session (e.g., collaborative) is initiated. At 702, workspace information is accumulated until session termination. At 704, the accumulated workspace information is stored with a link to the storage location. At 706, a new workspace session is initiated. At 708, an application links to the stored workspace information. At 710, the application combines the stored workspace information with new workspace information generated in the new session. At 712, a search query is formulated and executed against one or more data stores (e.g., enterprise web sites, Internet web sites) for relevant and/or related information based on the combined workspace information. At 714, the new session is terminated and the combined workspace information sent to the original workspace for query filter and historical data updating.

Figure 8:
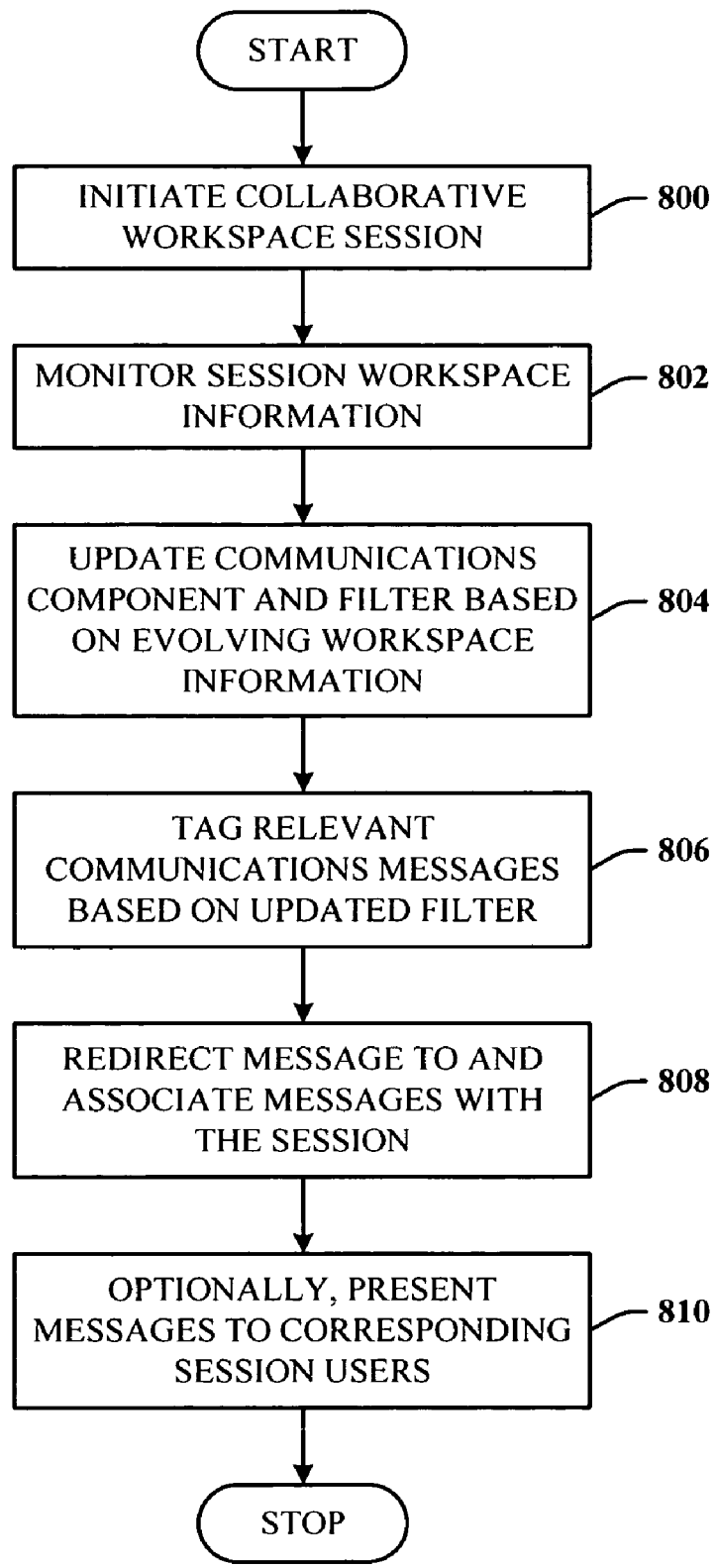
FIG. 8 illustrates a method of processing messages based on evolving workspace information of a collaborative workspace session.

FIG. 8 illustrates a method of processing messages based on evolving workspace information of a collaborative workspace session. During the workspace session, users can be communicating by many different means, including but not limited to, for example, email, instant messaging, SMS, MMS, voice-over-IP, and so on. These messages can be monitored (or handled remotely) and processed as part of the collaborative session. At 800, a collaborative workspace session is initiated. At 802, session workspace information is monitored. At 804, a communications component (e.g., email program) and/or the associated communications filter (e.g., classifier) is updated based on evolving workspace information during the session. At 806, messages communicated by users of the session and/or received by the session users are analyzed and, relevant and/or related messages are tagged based on the updated filter. At 808, the messages are redirected to and/or associated with the session. At 810, optionally, the relevant and/or related messages can be presented to the corresponding user.

Figure 9:
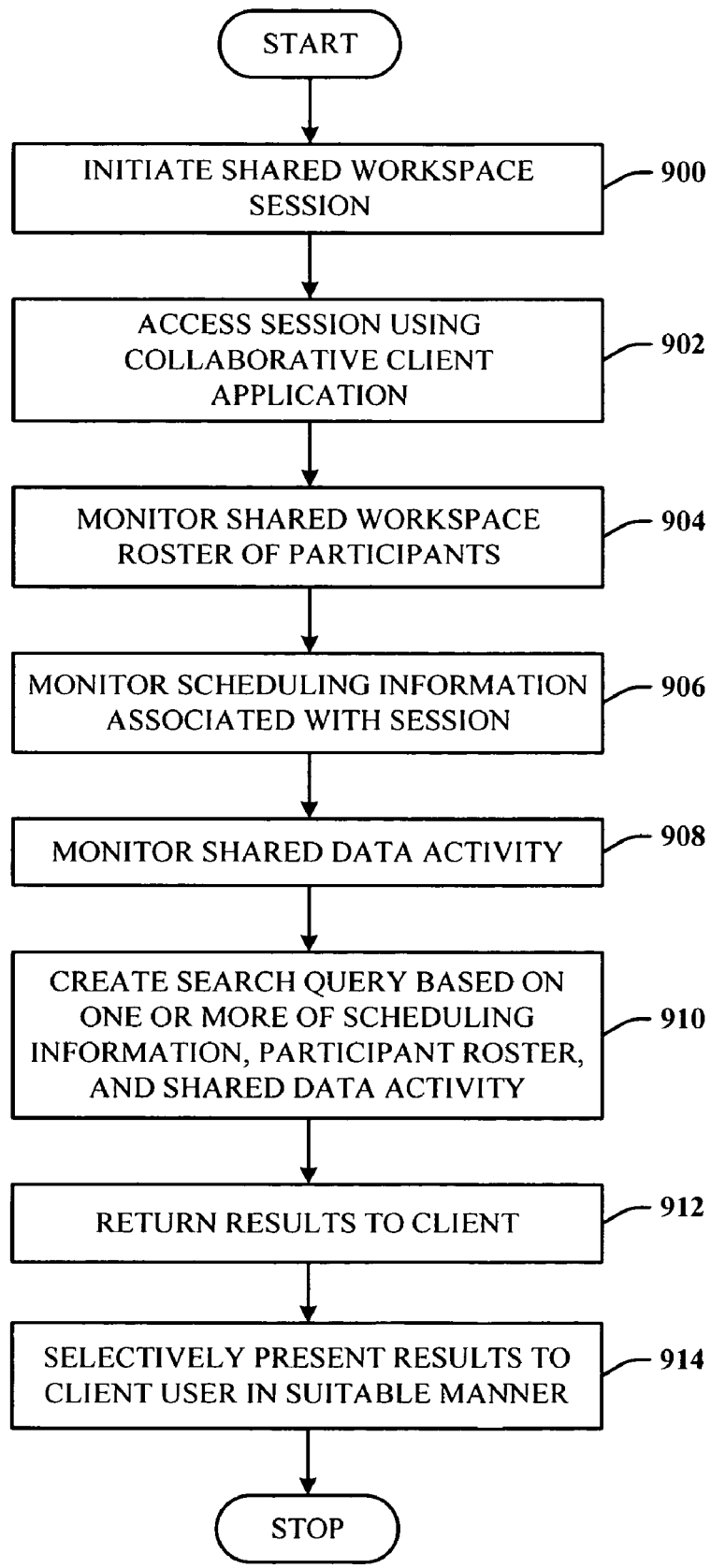
FIG. 9 illustrates a method of processing shared workspace information for a collaborative workspace client.

FIG. 9 illustrates a method of processing shared workspace information for a workspace client. As a participant in a collaborative workspace session, a client application can perform preliminary searches based on known information, such as scheduling information and a roster of session participants. For example, it the user knows from the session roster that a particular important user will be present, a search can be conducted as a preparatory action to return information relevant to that important user. As the session matures and the workspace information evolves, this information can be revised (or accumulated) to bring more up-to-date information to the client user.

At 900, a shared workspace session is initiated. At 902, a user accesses the session using a workspace client application. At 904, the client monitors a tentative roster of session participants. At 906, based on the roster, the client can access scheduling information for the roster of participants. At this time, optionally, a search can be conducted to return relevant and/or related information based on only the roster and schedules. However, at 908, additional information such as shared data activity can be obtained during the session and used in the search with the scheduling and roster information to return more relevant and/or related information, as indicated at 910. At 912, the results are retuned to the client application. At 914, the results can be selectively presented to the user during the session in a suitable manner. This can include displaying a blinking or colored indicator via the client user interface, displaying a message, or other type of alert or notification, should the user desired the notification to be made at all.

Figure 10:
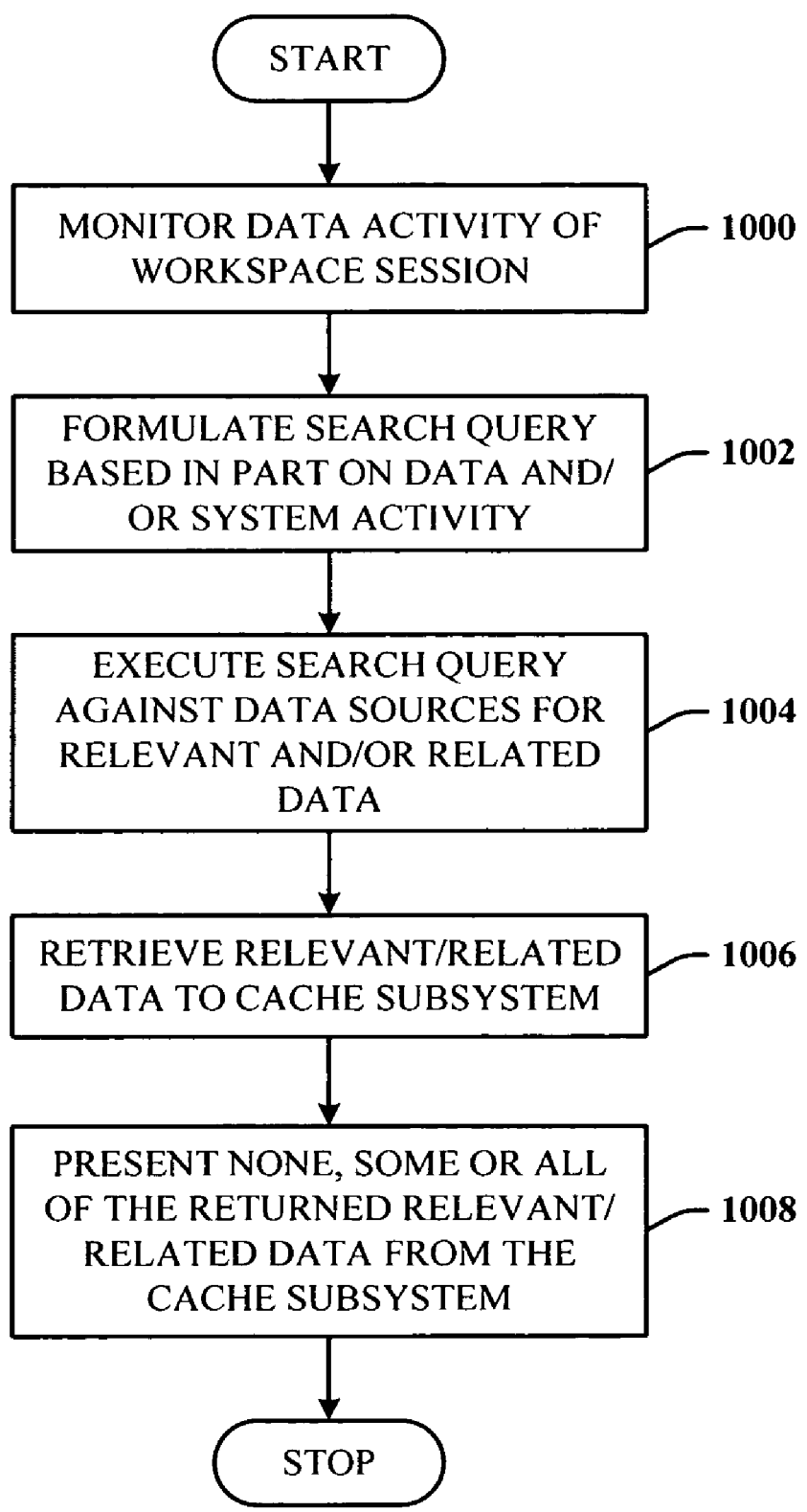
FIG. 10 illustrates a method of caching search results for workspace session processing.

FIG. 10 illustrates a method of caching search results for session processing. At 1000, data activity of a workspace session is monitored. At 1002, a search query is formulated based in part on data and/or system activity. At 1004, the search query is executed against data sources for relevant and/or related data. At 1006, the relevant and/or related data search results are returned to a cache subsystem. At 1008, some, all or none of the relevant and/or related data is processed and/or presented from the cache subsystem.

Figure 11:
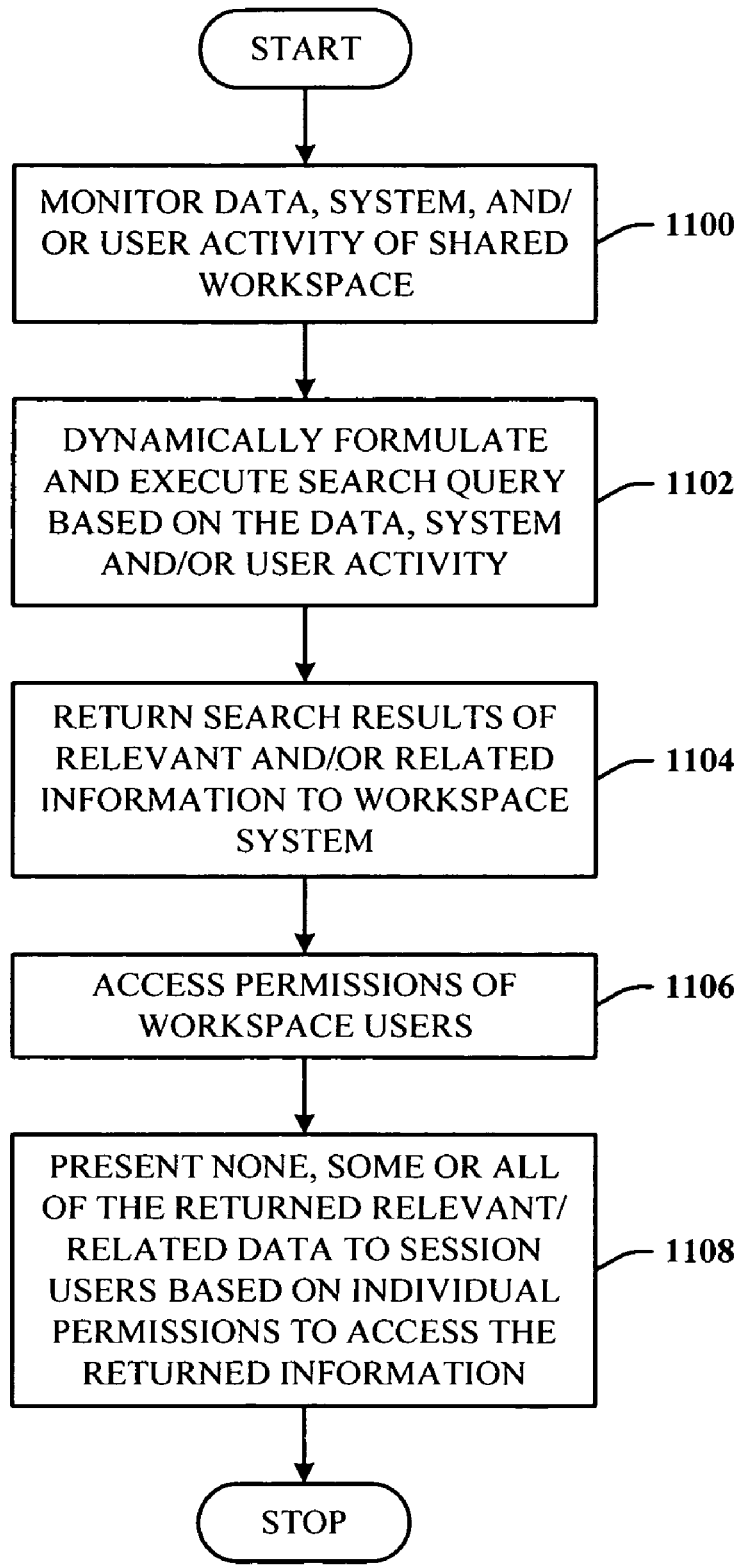
FIG. 11 illustrates a method of processing results according to a user role in a shared workspace.

FIG. 11 illustrates a method of processing results according to a user role in a shared workspace. It is to be appreciated that shared workspace (or collaborative) sessions will typically handle information that is accessible, and hence, viewable by all participants. However, it is conceivable that based on discussion content, two or more users will configure a separate workspace session in which to discuss or view information that should not be perceived by the other session participants.

At 1100, data, system, and/or user activity of a shared workspace is monitored. At 1102, a search query based on the data, system, and/or user activity is dynamically formulated and executed. At 1104, search results of relevant and/or related information are returned to the workspace system. At 1106, permissions associated with each workspace user are accessed. At 1108, none, some or all of the results are presented to one or more of the session participants based on user permissions to view the results.

Figure 12:
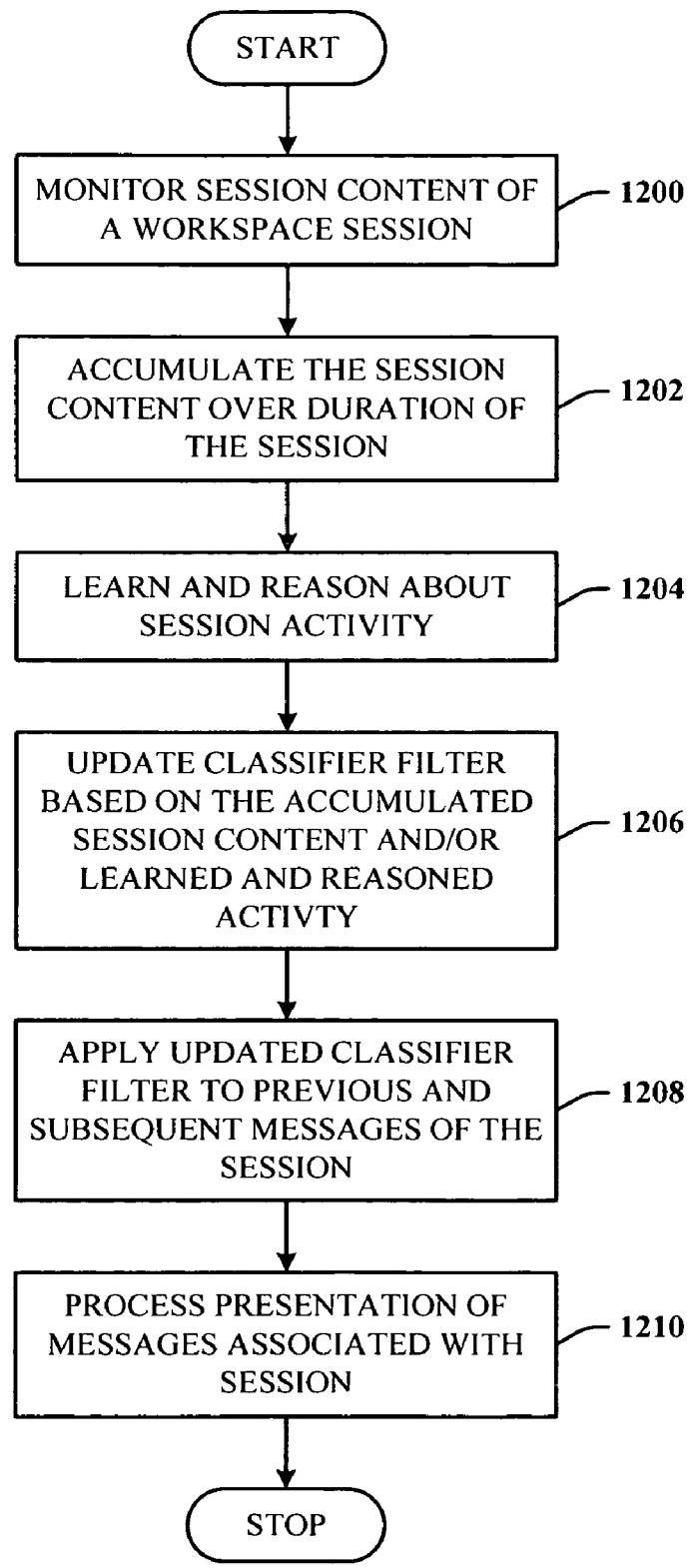
FIG. 12 illustrates a method of employing and updating a classifier filter for message processing associated with a workspace session.

FIG. 12 illustrates a method of employing and updating a classifier filter for message processing associated with a workspace session. At 1200, session content (e.g., data activity application activity) is monitored. At 1202, the session content can be accumulated over the duration of the session. At 1204, session content can be learned and reasoned about. At 1206, a classifier filter (e.g., Bayesian) is updated based on the accumulated session content and/or leaned and reasoned based on session activity. At 1208, the updated classifier filter is applied to previous and subsequent session messages. At 1210, messages associated with the session are processed for presentation.

Figure 13:
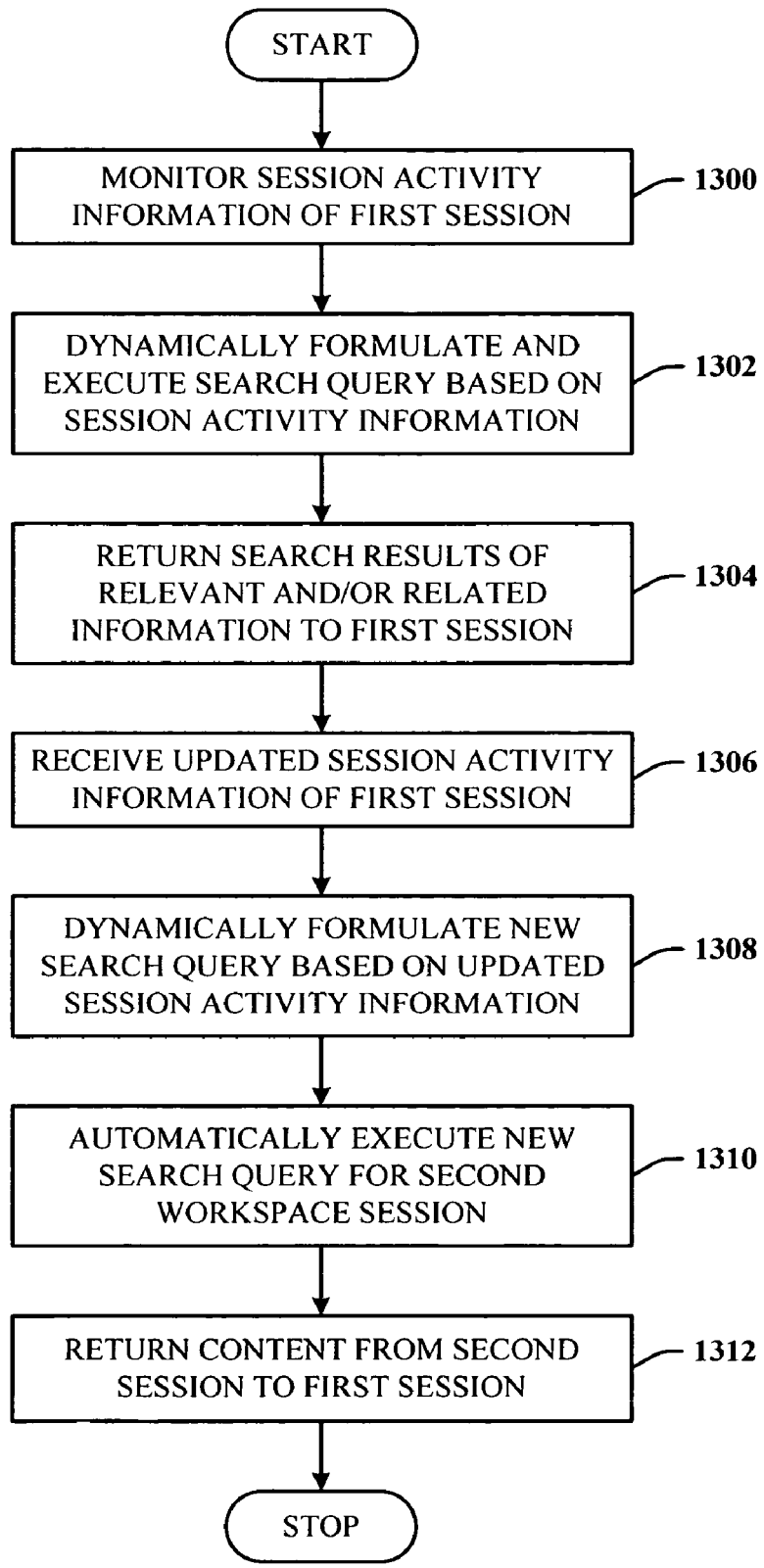
FIG. 13 illustrates a method of utilizing updated session content to search for another workspace session.

FIG. 13 illustrates a method of utilizing updated session content to search for another workspace session. At 1300, session activity information of a first session is monitored. At 1302, based on the first session activity information, a search query is dynamically formulated and executed. At 1304, search results of relevant and/or related information are returned to the first session. At 1306, updated session information of the first session is received. At 1308, a new search query is dynamically formulated based on the updated session activity information. At 1310, the new search query is automatically executed to find a second workspace session. At 1312, content for the second session is returned to the first session.

It can be appreciated that based on a wide variety of context information, searches can be dynamically and automatically executed against data stores and sources of information in an attempt to return search results that are useful for a more productive and efficient user environment. The disclosed architecture provides a more effective means for sifting through large amounts of information for the best information.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 14:
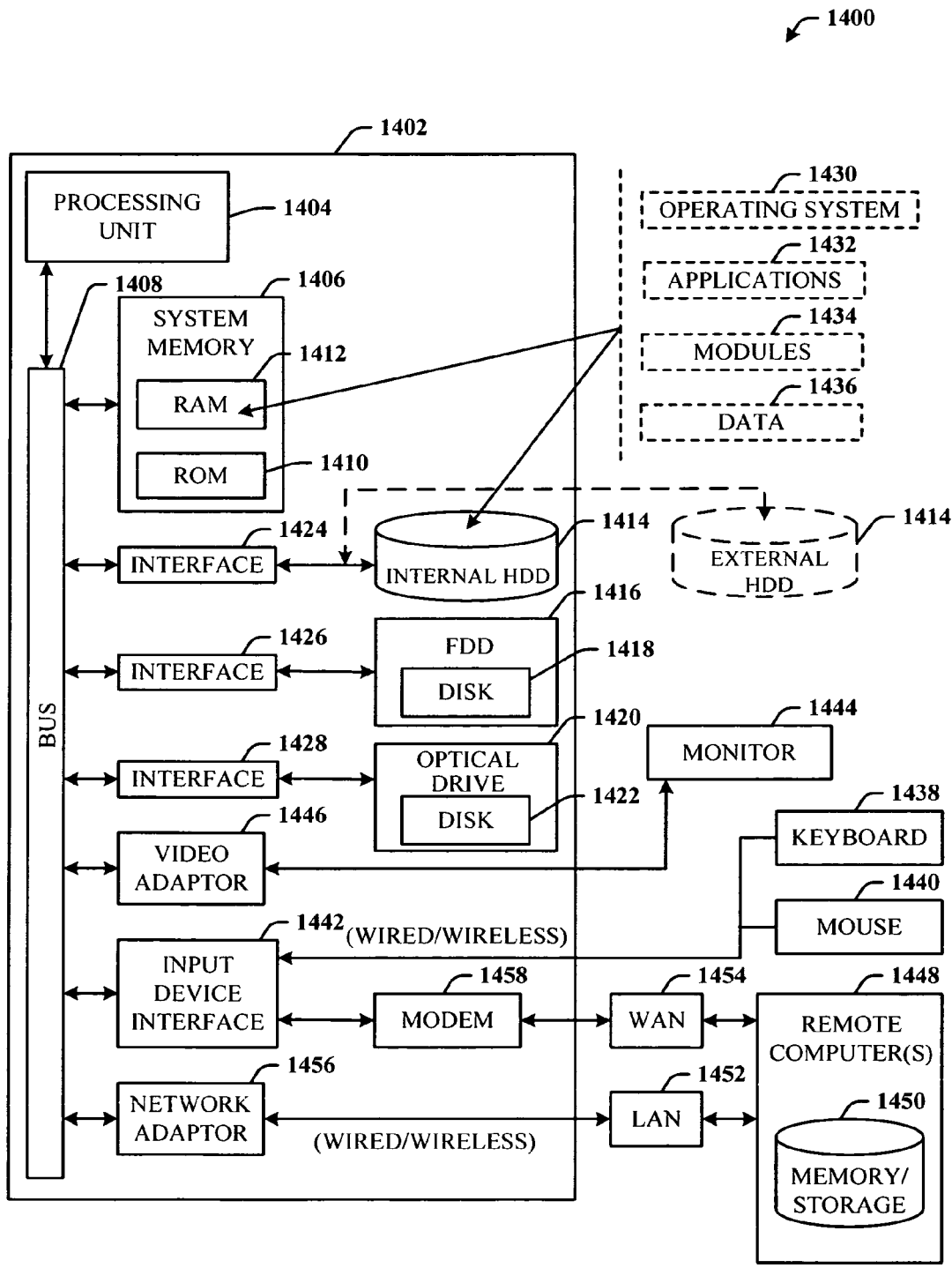
FIG. 14 illustrates a block diagram of a computing system operable to execute workspace filtering in accordance with the disclosed architecture.

Referring now to FIG. 14, there is illustrated a block diagram of a computing system 1400 operable to execute workspace filtering in accordance with the disclosed architecture. In order to provide additional context for various aspects thereof, FIG. 14 and the following discussion are intended to provide a brief, general description of a suitable computing system 1400 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 14, the exemplary computing system 1400 for implementing various aspects includes a computer 1402, the computer 1402 including a processing unit 1404, a system memory 1406 and a system bus 1408. The system bus 1408 provides an interface for system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is to be appreciated that the innovation can be implemented with various commercially available operating systems or combinations of operating systems. For example, the modules can include the data component 102 and search component 106 of FIG. 1, the inference component 304 of FIG. 3, collaboration application 502 and interfaces 520 of FIG. 5, as well as other clients and systems described herein.

A user can enter commands and information into the computer 1402 through one or more wired/wireless input devices, for example, a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 may operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, for example, a wide area network (WAN) 1454. Such LAN and WAN networking environments are commonplace in offices and companies, and facilitate enterprise-wide computer networks, such as intranets, all of which may connect to a global communications network, for example, the Internet.

When used in a LAN networking environment, the computer 1402 is connected to the local network 1452 through a wired and/or wireless communication network interface or adapter 1456. The adaptor 1456 may facilitate wired or wireless communication to the LAN 1452, which may also include a wireless access point disposed thereon for communicating with the wireless adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 15:
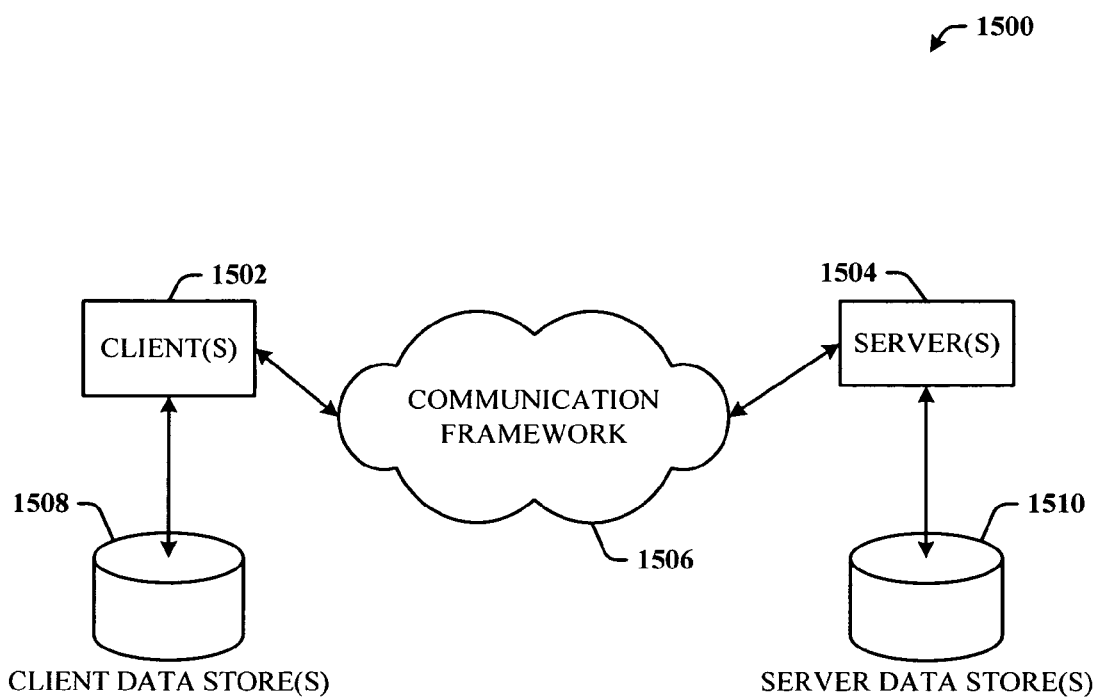
FIG. 15 illustrates a schematic block diagram of an exemplary computing environment that facilitates collaborative workspace computing session searching in accordance with the innovation.

Referring now to FIG. 15, there is illustrated a schematic block diagram of an exemplary computing environment 1500 that facilitates workspace session searching and results processing in accordance with the innovation. The system 1500 includes one or more client(s) 1502. The client(s) 1502 can be hardware and/or software (e.g., threads, processes, computing devices). The client(s) 1502 can house cookie(s) and/or associated contextual information by employing the subject innovation, for example.

The system 1500 also includes one or more server(s) 1504. The server(s) 1504 can also be hardware and/or software (e.g., threads, processes, computing devices). The servers 1504 can house threads to perform transformations by employing the architecture, for example. One possible communication between a client 1502 and a server 1504 can be in the form of a data packet adapted to be transmitted between two or more computer processes. The data packet may include a cookie and/or associated contextual information, for example. The system 1500 includes a communication framework 1506 (e.g., a global communication network such as the Internet) that can be employed to facilitate communications between the client(s) 1502 and the server(s) 1504.

Communications can be facilitated via a wired (including optical fiber) and/or wireless technology. The client(s) 1502 are operatively connected to one or more client data store(s) 1508 that can be employed to store information local to the client(s) 1502 (e.g., cookie(s) and/or associated contextual information). Similarly, the server(s) 1504 are operatively connected to one or more server data store(s) 1510 that can be employed to store information local to the servers 1504.

The clients 1502 can include desktop computing devices, portable computing devices and cell phones, for example. The framework 1506 can include the Internet and/or intranet architectures. The servers 1504 can include enterprise servers and Internet-based web sites, for example. Note that the clients 1502, alone, can facilitate a single workspace session and/or multi-user (or collaborative) workspace sessions, separate from utilization of the servers 1504 as multi-user (or collaboration sites).

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates data management, the system including a processing unit executing computer-executable program components stored in memory comprising:

a data component that monitors workspace activity of a shared workspace presented on display devices of participants during a collaborative workspace session and accumulates workspace information related to monitored workspace activity of the participants of the collaborative workspace session;

a search component that links to stored previous workspace information, automatically formulates a search query during the collaborative workspace session based on the workspace information accumulated by the data component and the stored previous workspace information, searches one or more data stores during the collaborative workspace session based on the search query, and obtains data relevant to the participants of the collaborative workspace session;

a presentation component for selectively presenting the data relevant to the participants during the collaborative workspace session based on the monitored workspace activity of the participants; and an inference component that, once the collaborative workspace session is completed:

uses the workspace information accumulated by the data component during the collaborative workspace session and the data relevant to the participants obtained by the search component to automatically update which participant activities are to be monitored by the data component and which data stores are to be searched by the search component, stores the accumulated workspace information of the completed collaborative workspace session with a link for use during future collaborative workspaces sessions, collects context information related to content and topics of the completed collaborative workspace session, and passes the context information to an email client of each participant of the completed workspace session to train an email message filter of each email client to automatically tag email messages relevant to the content and topics of the completed collaborative workspace session.

2. The system of claim 1, wherein data relevant to a particular session participant is obtained from a data store as a preparatory action for the collaborative workspace session.

3. The system of claim 1, wherein each email message filter is trained to tag relevant email messages as related to the completed collaborative workspace session.

4. The system of claim 1, wherein the inference component performs one or more of probabilistic-based analysis and statistical-based analysis to infer an action that a particular session participant desires to be automatically performed.

5. The system of claim 1, wherein each email message filter is trained to tag relevant email messages as requiring follow-up with a particular session participant of the completed collaborative workspace session.

6. The system of claim 1, wherein the search component automatically searches for a web site that serves web site data related to the workspace activity of the participants of the collaborative workspace session.

7. The system of claim 6, wherein the web site is an intranet web site that serves enterprise content related to collaborative workspace sessions.

8. The system of claim 1, wherein the workspace information accumulated by the data component includes session data which is employed by the search component to search for relevant data from remote data sources.

9. The system of claim 1, wherein the data component monitors data presented to a particular session participant and the search component obtains data relevant to the particular session participant based on the presented data.

10. The system of claim 1, wherein the data component monitors scheduling information for a particular session participant and the search component obtains data relevant to the particular session participant based on the scheduling information.

11. A computer-implemented method of managing data, comprising:

monitoring workspace activity of a shared workspace presented on display devices of participants during a collaborative workspace session;

accumulating workspace information related to the monitored workspace activity of the participants of the collaborative workspace session;

linking to stored previous workspace information;

automatically formulating a search query based on the workspace information accumulated during the collaborative workspace session and the stored previous workspace information;

searching one or more data sources during the collaborative workspace session based on the search query;

retrieving data relevant to the participants of the collaborative workspace session;

selectively presenting the data relevant to the participants during the collaborative workspace session based on the monitored workspace activity of the participants; and once the collaborative workspace session is completed:

automatically updating which participant activities are to be monitored and which data sources are to be searched using the workspace information accumulated during the collaborative workspace session and the data relevant to the participants, storing the accumulated workspace information of the completed collaborative workspace session with a link for use during future collaborative workspaces sessions, collecting context information related to content and topics of the completed collaborative workspace session, and passing the context information to an email client of each participant of the completed collaborative workspace session to train an email filter of each email client to automatically tag email messages relevant to the content and topics of the completed collaborative workspace session.

12. The method of claim 11, wherein each email message filter is trained to tag relevant email messages as related to the completed workspace session.

13. The method of claim 11, further comprising searching and retrieving data relevant to a particular session participant as a preparatory action for the collaborative workspace session.

14. The method of claim 11, further comprising linking to the stored accumulated workspace information of the completed collaborative workspace session from a new collaborative workspace session.

15. The method of claim 11, further comprising:

linking to stored previous workspace information for a plurality of previous collaborative workspace sessions based on the monitored workspace activity; and combining the workspace information accumulated during the collaborative workspace session with the stored previous workspace information for the plurality of previous collaborative workspace sessions.

16. The method of claim 11, further comprising redirecting relevant email messages received by an email client of a particular session participant of the completed collaborative workspace session to a collection of topics associated with the completed collaborative workspace session.

17. The method of claim 11, wherein the search query based on the workspace information accumulated during the collaborative workspace session and the stored previous workspace information is executed against an internal collaboration site.

18. The method of claim 11, further comprising dynamically generating a new search query based on new workspace information detected during the collaborative workspace session and searching the one or more data sources based on the new search query to return new data relevant to the participants of the collaborative workspace session.

19. The method of claim 11, wherein each email message filter is trained to tag relevant email messages as requiring follow-up with a particular session participant of the completed collaborative workspace session.

20. A computing device including a processing unit and memory, the computing device comprising:
- computer-implemented means for monitoring workspace activity of a shared workspace presented on display devices of participants during a collaborative workspace session;
- computer-implemented means for accumulating workspace information related to the monitored workspace activity of the participants of the collaborative workspace session;
- computer-implemented means for linking to stored previous workspace information and for formulating a search query based on the workspace information accumulated during the collaborative workspace session and the stored previous workspace information;
- computer-implemented means for searching one or more data sources during the collaborative workspace session based on the search query and for obtaining data relevant to the participants of the collaborative workspace session;
- computer-implemented means for selectively presenting the data relevant to the participants during the collaborative workspace session based on the monitored workspace activity of the participants; and
- computer-implemented means for:
  - using the workspace information accumulated during the collaborative workspace session and the data relevant to the participants to automatically update which participant activities are to be monitored and which data stores are to be searched once the collaborative workspace session is completed,
  - storing the accumulated workspace information of the completed collaborative workspace session with a link for use during future collaborative workspaces sessions,
  - collecting context information related to content and topics of the completed collaborative workspace session, and
  - passing the context information to an email client of each participant of the completed workspace session to train an email message filter of each email client to automatically tag email messages relevant to the contents and topics of the completed collaborative workspace session.

* * * * *